United States Patent
Yu et al.

(10) Patent No.: US 10,785,345 B2
(45) Date of Patent: Sep. 22, 2020

(54) INFORMATION PROCESSING METHOD, CLIENT, SERVER AND COMPUTER-READABLE STORAGE MEDIUM

(71) Applicant: TENCENT TECHNOLOGY (SHENZHEN) COMPANY LIMITED, Shenzhen (CN)

(72) Inventors: Xiaoyu Yu, Shenzhen (CN); Bin Zhang, Shenzhen (CN); Libin Ren, Shenzhen (CN); Wei Mao, Shenzhen (CN); Sixin Gu, Shenzhen (CN); Qiang Lu, Shenzhen (CN); Yongjie Li, Shenzhen (CN); Xuan Ye, Shenzhen (CN); Wenrui Zhang, Shenzhen (CN); Keren Li, Shenzhen (CN); Wenxin Liao, Shenzhen (CN); Jinming Zhang, Shenzhen (CN); Yi Gao, Shenzhen (CN); Boen Liang, Shenzhen (CN); Zeming Fan, Shenzhen (CN); Weizhao Li, Shenzhen (CN); Leming Fang, Shenzhen (CN); Tanhong Li, Shenzhen (CN); Guowei Xiang, Shenzhen (CN); Xinji Nie, Shenzhen (CN); Rui Tang, Shenzhen (CN); Haixia Rao, Shenzhen (CN); Feng Chen, Shenzhen (CN); Yi Wu, Shenzhen (CN); Chen Gong, Shenzhen (CN); Qianya Lin, Shenzhen (CN); Junbin Kuang, Shenzhen (CN); Siyu Xiao, Shenzhen (CN); Pengfei Wang, Shenzhen (CN); Leteng Weng, Shenzhen (CN); Xiaobin Fang, Shenzhen (CN); Mengsha Zhou, Shenzhen (CN); Zhenzhen Xu, Shenzhen (CN); Bei Yang, Shenzhen (CN); Shaomian Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 216 days.

(21) Appl. No.: 15/677,384

(22) Filed: Aug. 15, 2017

(65) Prior Publication Data
US 2017/0346927 A1 Nov. 30, 2017

Related U.S. Application Data

(63) Continuation of application No. PCT/CN2016/072047, filed on Jan. 25, 2016.

(30) Foreign Application Priority Data

Feb. 16, 2015 (CN) .......................... 2015 1 0085626

(51) Int. Cl.
*H04L 29/06* (2006.01)
*H04L 12/58* (2006.01)
(Continued)

(52) U.S. Cl.
CPC .............. *H04L 67/42* (2013.01); *H04L 51/14* (2013.01); *H04L 51/24* (2013.01); *G06Q 20/10* (2013.01); *H04L 67/306* (2013.01)

(58) Field of Classification Search
CPC ......... H04L 67/42; H04L 51/14; H04L 51/24; H04L 67/306; G06Q 20/10
(Continued)

(56) References Cited

U.S. PATENT DOCUMENTS

| 8,326,770 B1 * | 12/2012 | Weisman | ............... | G06Q 50/01 |
| | | | | 705/319 |
| 9,696,865 B2 * | 7/2017 | Lindo | ................... | G06F 3/0481 |

(Continued)

FOREIGN PATENT DOCUMENTS

| CN | 101662735 A | 3/2010 |
| CN | 103179156 A | 6/2013 |

(Continued)

OTHER PUBLICATIONS

International Search Report in international application No. PCT/CN2016/072047, dated May 5, 2016.
(Continued)

*Primary Examiner* — Vivek Srivastava
*Assistant Examiner* — Binod J Kunwar
(74) *Attorney, Agent, or Firm* — Brinks Gilson & Lione

(57) ABSTRACT

An information processing method, which is applied to a server, includes: a public message is transmitted to a first client, the public message being a message issued to the first client by the server, the public message carrying first information and a second information set including N pieces of second information, with N being a positive integer, the first information is information only allowed to be gotten by the first client and the second information is information only allowed to be gotten by a client in a sharing relationship with the first client; and a request for getting the second information is received from a second client, it is verified whether the second client is in the sharing relationship with the first client, and after the second client is determined to be in the sharing relationship with the first client, the second client is allowed to get the second information.

6 Claims, 13 Drawing Sheets

(51) Int. Cl.
  *H04L 29/08* (2006.01)
  *G06Q 20/10* (2012.01)
(58) Field of Classification Search
  USPC .......................................... 709/203; 705/39
  See application file for complete search history.

(56) References Cited

U.S. PATENT DOCUMENTS

| | | | | |
|---|---|---|---|---|
| 9,893,903 | B2* | 2/2018 | Ickman | H04W 4/21 |
| 10,108,940 | B2* | 10/2018 | Kosloski | G06Q 50/01 |
| 2008/0140520 | A1* | 6/2008 | Hyder | G06Q 30/0207 |
| | | | | 705/14.1 |
| 2008/0255954 | A1* | 10/2008 | Leung | G06Q 30/0219 |
| | | | | 705/14.1 |
| 2009/0307089 | A1* | 12/2009 | Binnewies | G06Q 30/02 |
| | | | | 705/14.55 |
| 2010/0274648 | A1* | 10/2010 | Leung | G06Q 30/0219 |
| | | | | 705/14.13 |
| 2011/0029363 | A1* | 2/2011 | Gillenson | G06Q 30/0216 |
| | | | | 705/14.15 |
| 2011/0313839 | A1* | 12/2011 | Walsh | G06Q 30/02 |
| | | | | 705/14.35 |
| 2013/0006788 | A1* | 1/2013 | Zhou | G06Q 30/02 |
| | | | | 705/26.1 |
| 2013/0041824 | A1* | 2/2013 | Gupta | G06Q 20/14 |
| | | | | 705/44 |
| 2013/0166360 | A1* | 6/2013 | Kshetramade | G06Q 30/02 |
| | | | | 705/14.1 |
| 2014/0018040 | A1* | 1/2014 | Kim | H04W 12/06 |
| | | | | 455/411 |
| 2014/0032684 | A1 | 1/2014 | Chung et al. | |
| 2014/0207847 | A1* | 7/2014 | van Wel | H04L 12/1435 |
| | | | | 709/203 |
| 2014/0257945 | A1* | 9/2014 | Sandridge | G06Q 30/0207 |
| | | | | 705/14.4 |
| 2014/0297386 | A1* | 10/2014 | Allen | H04L 12/1403 |
| | | | | 705/14.27 |
| 2015/0012419 | A1* | 1/2015 | Lawler | G06Q 10/10 |
| | | | | 705/39 |
| 2015/0081446 | A1* | 3/2015 | Callahan | G06Q 30/02 |
| | | | | 705/14.58 |
| 2015/0081473 | A1* | 3/2015 | Ng | G06Q 20/10 |
| | | | | 705/26.7 |
| 2015/0178693 | A1* | 6/2015 | Solis | G06Q 30/06 |
| | | | | 705/30 |
| 2015/0256644 | A1* | 9/2015 | Zuckerberg | H04L 67/02 |
| | | | | 709/203 |
| 2017/0032289 | A1* | 2/2017 | Tseng | G06Q 10/1095 |

FOREIGN PATENT DOCUMENTS

| | | |
|---|---|---|
| CN | 103312757 A | 9/2013 |
| CN | 104618226 A | 5/2015 |

OTHER PUBLICATIONS

English Translation of the Written Opinion of the International Search Authority in international application No. PCT/CN2016/072047, dated May 5, 2016.

«http://www.haokoo.com/elect/470940.html», issued on Oct. 16, 2013.

«http://www.mamicode.com/info-detail-470249.html», issued on Feb. 10, 2015.

«http://www. candylove . cn/view.php?id-730», issued on Jun. 21, 2014.

Notification of the First Office Action of Chinese application No. 201510085626.1, dated Feb. 3, 2016.

* cited by examiner

INFORMATION PROCESSING METHOD, CLIENT, SERVER AND COMPUTER-READABLE STORAGE MEDIUM

CROSS REFERENCE TO RELATED APPLICATIONS

This is a continuation application of International Patent Application No. PCT/CN2016/072047, filed on Jan. 25, 2016, which claims priority to Chinese Patent Application No. 201510085626.1 filed on Feb. 16, 2015. The disclosures of these applications are incorporated by reference herein in their entirety.

BACKGROUND

Along with development of the Internet, there emerge a large number of network communication tools, and based on these network communication tools, communication and interconnection between users are implemented, wherein more widely used network communication tools include: QQ, WeChat, microblog and the like. There are official accounts in a network communication tool, including a development account of the network communication tool, official accounts registered by government organizations and enterprises, accounts of public figures and the like, and these official accounts are usually required to transmit public messages to ordinary user accounts; a user account receiving a public message logs in a public message page such as a content notification page, a resource distribution page and a public activity page, and then receives or obtains related information carried in the page; and the user account receiving the public message may also share the public message to another user account, and the other user account is also required to log in the corresponding public message page to receive or obtain the related information carried in the page after receiving the shared public message.

Obviously, an ordinary user account receiving a public message from an official account may only share the public message if being required to share in a related technology, that is, only a public message page may be shared, and a user account receiving the shared message is also required to log in the public message page to receive or obtain related information carried in the page; and the user account receiving the shared message may not receive or obtain the related information carried in the page if not logging in the public message page. In such a public message issuing and sharing manner in the related technology, the related information carried in the message may not be widely propagated as widely as possible, and impact of issuing of the public message is relatively weaker.

SUMMARY

The disclosure relates to the technical field of Internet communication, and in particular to an information processing method, a client, a server and a computer-readable storage medium.

In order to solve the existing technical problem, the embodiment of the disclosure provides an information processing method, a client, a server and a computer-readable storage medium.

The embodiment of the disclosure provides an information processing method, which may be applied to a server, the method including that:

a public message is transmitted to a first client, the public message being a message issued to the first client by the server, the public message carrying first information and a second information set, the second information set including N pieces of second information, with N being a positive integer, wherein the first information may be information only allowed to be gotten by the first client and the second information may be information only allowed to be gotten by a client in a sharing relationship with the first client; and a request for getting the second information is received from a second client, it is verified whether the second client is in the sharing relationship with the first client, and after the second client is determined to be in the sharing relationship with the first client, the second client is allowed to get the second information.

In the solution, after the public message is transmitted to the first client and before the request for getting the second information is received from the second client, the method may further include that:

an information sharing request transmitted by the first client is received, the information sharing request carrying the second information and information about one or more information-sharing target users, and the information sharing request being configured to indicate the second information to be shared to a target user; and the second information and the information about the target users in the information sharing request are extracted, a sharing notification message is generated according to the extracted second information and the extracted information about the target users, and the sharing notification message is transmitted to one or more clients of the one or more target users, the sharing notification message being configured to notify the target users that a user of the first client requests to share the second information.

In the solution, before the step that public message is transmitted to the first client, the method may further include that:

information requests are received from multiple clients, the information requests carrying characteristic information of respective users of the clients; and a client, characteristic information of which matches a preset first information issuing condition, is selected from the clients transmitting the information requests as the first client.

In the solution, a corresponding relationship between the first information and the second information set may be maintained in a Data Base (DB) of the server, and the second information which has been gotten is counted; and after the second client is determined to be in the sharing relationship with the first client, the method may further include that:

whether the amount of the second information which has been gotten reaches N, the second client is notified that all of the second information has been gotten if YES, and if NO, the second client is allowed to get the second information.

In the solution, the first information and the second information may be cash-filled red packets, and the step that the second client is allowed to get the second information may include that:

a transfer charging terminal is notified to execute transfer processing on an account of a user of the second client, and an amount in the account, stored in the DB of the server, of the user of the second client is correspondingly modified; and a message notifying that the second information is successfully gotten is transmitted to the second client after transfer processing is finished.

In the solution, the step that it is verified whether the second client is in the sharing relationship with the first client may include that:

user information of the first client and information about users sharing information with a user of the first client are acquired, and user information of the second client is acquired; and it is searched whether the information about the users sharing information with the user of the first client includes the user information of the second client, it is determined that the second client is in the sharing relationship with the first client if YES, and if NO, it is determined that the second client is not in the sharing relationship with the first client.

The embodiment of the disclosure further provides an information processing method, which may be applied to a first client, the method including that:

a public message transmitted by a server is received, the public message being a message requested by an official account to be issued to the first client by the server, the public message carrying first information and a second information set, the second information set including N pieces of second information, with N being a positive integer, wherein the first information may be information only allowed to be gotten by the first client and the second information may be information only allowed to be gotten by a client in a sharing relationship with the first client; and the first information is gotten, a sharing target user is selected from users in the sharing relationship with a user of the first client, and an information sharing request is transmitted to the server, the information sharing request carrying the second information and information about one or more information-sharing target users, and the information sharing request being configured to indicate the second information to be shared to the target user.

In the solution, the method may further include that: after the information sharing request is transmitted to the server, an information sharing result returned by the server is received, the information sharing result indicating the information of the target user successfully getting the second information.

In the solution, before the step that the public message transmitted by the server is received, the method may further include that:

an information request is transmitted to the server for requesting the first information from the server, wherein the information request may carry characteristic information of the user of the first client and the characteristic information may serve as a basis for the server to determine whether a preset first information issuing condition is matched.

The embodiment of the disclosure further provides an information processing method, which may be applied to a second client, the method including that:

a sharing notification message transmitted by a server is received, the sharing notification message being configured to notify a user of the second client that a user of a first client requests to share second information, wherein the second information may be information only allowed to be gotten by a client in a sharing relationship with the first client; and a request for getting the second information is transmitted to the server, and an information getting result returned by the server is received.

In the solution, if the second client is verified to be in the sharing relationship with the first client and there is still some second information not received when the server receives the request for getting the second information of the second client, the second client may receive an information receiving success result; and otherwise, the second client may receive an information receiving failure result.

The embodiment of the disclosure further provides a server, which may include:

a first transmitting unit configured to transmit a public message to a first client, the public message being a message issued to the first client by the server, the public message carrying first information and a second information set, the second information set including N pieces of second information, with N being a positive integer, wherein the first information may be information only allowed to be gotten by the first client and the second information may be information only allowed to be gotten by a client in a sharing relationship with the first client;

a first receiving unit configured to receive a request for getting the second information from a second client; and a first processing unit configured to, after the first receiving unit receives the request for getting the second information from the second client, verify whether the second client is in the sharing relationship with the first client, and after determining that the second client is in the sharing relationship with the first client, allow the second client to get the second information.

In the solution, the first receiving unit may be configured to, after the first transmitting unit transmits the public message to the first client and before the first receiving unit receives the request for getting the second information from the second client, receive an information sharing request transmitted by the first client, the information sharing request carrying the second information and information about one or more information-sharing target users, and the information sharing request being configured to indicate the second information to be shared to a target user;

the first processing unit may be configured to extract the second information and the information about the target users in the information sharing request, generate a sharing notification message according to the extracted information, and provide the sharing notification message for the first transmitting unit; and the first transmitting unit may be configured to transmit the sharing notification message to one or more clients of the one or more target users, the sharing notification message being configured to notify the target user that a user of the first client requests to share the second information.

In the solution, the first receiving unit may be configured to, before the first transmitting unit transmits the public message to the first client, receive information requests from multiple clients, the information requests carrying characteristic information of respective users of the clients; and the first processing unit may be configured to select, from the clients transmitting the information requests, a client, characteristic information of which matches a preset first information issuing condition, as the first client.

In the solution, the server may further include a DB unit configured to maintain a corresponding relationship between the first information and the second information set, and count the second information which has been gotten; and the first processing unit may be configured to, after determining that the second client is in the sharing relationship with the first client, determine whether the amount of the second information which has been gotten reaches N according to a record in the DB unit, notify the second client that all of the second information has been gotten through the first transmitting unit if YES, and if NO, allow the second client to get the second information.

In the solution, the first information and the second information may be cash-filled red packets, and the operation that the first processing unit allows the second client to get the second information may include:

notifying a transfer charging terminal to execute account transfer processing on an account of a user of the second client, and correspondingly modifying an amount in the account, stored in a DB of the server, of the user of the second client; and transmitting a message notifying that the second information is successfully gotten to the second client through the first transmitting unit after transfer processing is finished.

In the solution, the first processing unit may further be configured to verify whether the second client is in the sharing relationship with the first client in a manner of:

acquiring user information of the first client and information about users sharing information with a user of the first client, and acquiring user information of the second client; and searching whether the information about the users sharing information with the user of the first client includes the user information of the second client, determining that the second client is in the sharing relationship with the first client if YES, and if NO, determining that the second client is not in the sharing relationship with the first client.

The embodiment of the disclosure further provides a first client, which may include:

a second receiving unit configured to receive a public message transmitted by a server, the public message being a message requested by an official account to be issued to the first client by the server, the public message carrying first information and a second information set, the second information set including N pieces of second information, with N being a positive integer, wherein the first information may be information only allowed to be gotten by the first client and the second information may be information only allowed to be gotten by a client in a sharing relationship with the first client;

a second processing unit configured to receive the first information, and select a sharing target user from users in the sharing relationship with a user of the first client; and a second transmitting unit configured to transmit and an information sharing request to the server, the information sharing request carrying the second information and information about one or more information-sharing target users, and the information sharing request being configured to indicate the second information to be shared to the target user.

In the solution, the second receiving unit may be configured to, after the second transmitting unit transmits the information sharing request to the server, receive an information sharing result returned by the server, the information sharing result indicating the information of the target user successfully getting the second information.

In the solution, the second transmitting unit may be configured to, before the second receiving unit receives the public message transmitted by the server, transmit an information request to the server for requesting the first information from the server, wherein the information request may carry characteristic information of the user of the first client and the characteristic information may serve as a basis for the server to determine whether a preset first information issuing condition is matched.

The embodiment of the disclosure further provides a second client, which may include:

a third receiving unit configured to receive a sharing notification message transmitted by a server, the sharing notification message being configured to notify a user of the second client that a user of a first client requests to share second information, wherein the second information may be information only allowed to be gotten by a client in a sharing relationship with the first client; and a third transmitting unit configured to transmit a request for getting the second information to the server, the third receiving unit being configured to receive an information getting result returned by the server.

In the solution, if the second client is verified to be in the sharing relationship with the first client and there is still some second information not received when the server receives the request for getting the second information of the second client, the third receiving unit may receive an information receiving success result; and otherwise, the third receiving unit may receive an information receiving failure result.

The embodiment of the disclosure further provides a computer-readable storage medium, which may include a set of instructions, the instructions being executed to cause at least one processor to execute the following operation of:

transmitting a public message to a first client, the public message being a message issued to a first client by a server and the public message carrying first information and a second information set, wherein the second information set may include N pieces of second information, N may be a positive integer, the first information may be information only allowed to be gotten by the first client and the second information may be information only allowed to be gotten by a client in a sharing relationship with the first client; and receiving a request for getting the second information from a second client, verifying whether the second client is in the sharing relationship with the first client, and after determining that the second client is in the sharing relationship with the first client, allowing the second client to get the second information.

According to the information processing method, client and server provided by the embodiment of the disclosure, the public message issued by the official account through the server carries the first information and the second information set, the first information being information only allowed to be gotten by the first client and the second information being information only allowed to be gotten by the client in the sharing relationship with the first client; and in such an inter-client sharing manner, the message issued to a client by the official account through the server may be propagated to multiple different clients, and the related information carried in the message may be propagated as widely as possible, so that influence of issuing of the public message is expanded. In addition, in the embodiment of the disclosure, the first client shares the second information in the public message rather than a similar public message page such as a content notification page, a resource distribution page and a public activity page to the second client through the server, that is, the first client shares a second information content rather than the public message page such as the content notification page, the resource distribution page and the public activity page, so that the content may be shared more directly and conveniently.

DETAILED DESCRIPTION

The technical solutions of the disclosure will be further elaborated below with reference to the drawings and specific embodiments in detail.

Embodiment 1

Figure 1:
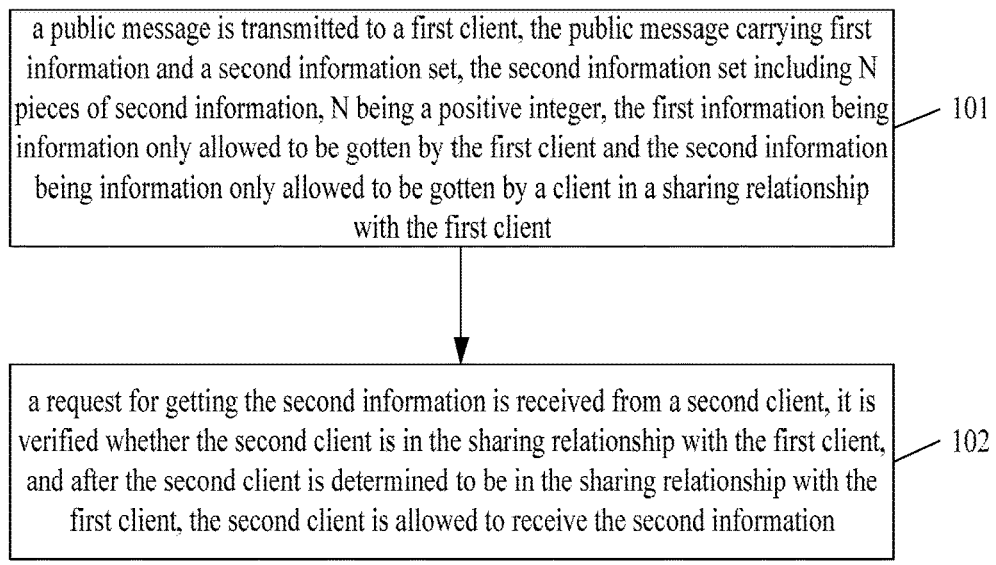
FIG. 1 is a flowchart of an information processing method according to embodiment 1 of the disclosure.

Embodiment 1 of the disclosure provides an information processing method, which is applied to a server, and as shown in FIG. 1, the method mainly includes the following steps.

Step 101: a public message is transmitted to a first client, the public message being a message requested by an official account to be issued to the first client by the server, the public message carrying first information and a second information set, herein the second information set includes N pieces of second information, with N being a positive integer, the first information is information only allowed to be gotten by the first client and the second information is information only allowed to be gotten by a client in a sharing relationship with the first client.

In the embodiment of the disclosure, the official account may transmit a request to the server to request the server to issue the public message to a client of an ordinary user account when being required to transmit the public message to an ordinary user account; and the server may select the first client of a transmitting object user according to the request of the official account, and transmit the public message to the first client which is selected. It is important to note that the public message in the embodiment of the disclosure mainly includes two types of information, one is the first information, which is the information only allowed to be gotten by the first client, the other is second information, which is the information only allowed to be gotten by the client (such as a client of a friend of a user of the first client) in the sharing relationship with the first client, there may be multiple pieces of second information, and the multiple pieces of second information form the second information set, wherein a content of each piece of second information in the second information set may be the same, and may also be different, and no matter whether the contents are the same or different, the second information in the second information set is required to be distributed to different clients.

In an implementation mode, after the public message is transmitted to the first client, the method of embodiment 1 of the disclosure may further include that:

an information sharing request transmitted by the first client is received, the information sharing request carrying the second information and information about one or more information-sharing target users, and the information sharing request being configured to indicate the second information to be shared to a target user; and the second information and the information about target users in the information sharing request are extracted, a sharing notification message is generated according to the extracted information, and the sharing notification message is transmitted to one or more clients of the one or more target users, the sharing notification message being configured to notify the target user that the user with the first client requests to share the second information.

After receiving the public message transmitted by the server, the first client receives the first information therein; and since the second information is the information only allowed to be gotten by the client in the sharing relationship with the first client, that is, the second information is information required to be shared by the first client, the user of the first client is required to select the target user in the sharing relationship therewith for sharing the second information, and the first client may generate the corresponding information sharing request for transmitting to the server according to the target user selected by its user, the information sharing request including the second information to be shared and the information about one or more information-sharing target users. The server may learn about the target user to which the second information is required to be shared according to the received information sharing request, thereby accordingly generating and transmitting the sharing notification message to one or more clients of the one or more target users to notify the target users that the user of the first client has shared the second information for the target user to receive.

In another implementation mode, before the public message is transmitted to the first client, the method of embodiment 1 of the disclosure may further include that:

information requests are received from multiple clients, the information requests carrying characteristic information of respective users of the clients; and a client, characteristic information of which matches a preset first information issuing condition, is selected from the clients transmitting the information requests as the first client.

That is, the official account may only issue the public message to a client with an information acquisition requirement through the server, and of course, the embodiment of the disclosure does not exclude a mode that the official account actively pushes the public message to a client through the server.

The mode that the official account may only issue the public message to the client with the information acquisition requirement through the server may also be understood as a mode that the client competitively acquires the information; and a large number of clients transmit information requests (for requesting to acquire the public message of the official account) to the server, and the server may screen the client consistent with the preset first information issuing condition (the characteristic information of the user of the client is required to match the preset first information issuing condition) as the first client capable of receiving the public message according to the preset first information issuing condition submitted by the official account. For example: if the first information issuing condition is sequential transmitting, the clients may sequentially acquire the information from a certain time point or within a specific time range according to a sequence of the information requests which are received by the server; or, if the first information issuing condition is a geographical position, it is determined whether a geographical position of the client is consistent with the condition according to position information carried in the information request of the client, the client is selected as the first client if YES, and if NO, the client is not selected as the first client.

Step 102: a request for getting the second information is received from a second client, it is verified whether the second client is in the sharing relationship with the first client, and after the second client is determined to be in the sharing relationship with the first client, the second client is allowed to get the second information.

Wherein, it is verified whether the second client is in the sharing relationship with the first client includes that:

user information of the first client and information about users sharing information with a user of the first client are acquired, and user information of the second client is acquired; and it is searched whether the information about the users sharing information with the user of the first client includes the user information of the second client, it is determined that the second client is in the sharing relationship with the first client if YES, and if NO, it is determined that the second client is not in the sharing relationship with the first client.

For example: the server acquires the user information of the first client and friend information of the user of the first client, and acquires the user information of the second client; and it is determined whether a user of the second client is a friend user of the user of the first client according to the user information of the second client, it is determined that the second client is in the sharing relationship with the first client if YES, and if NO, it is determined that the second client is not in the sharing relationship with the first client.

In an implementation mode, a corresponding relationship between the first information and the second information set is maintained in a DB of the server, and the second information which has been gotten is counted; and after the second client is determined to be in the sharing relationship with the first client, the method of embodiment 1 of the disclosure further includes that:

it is determined whether the amount of the second information which has been gotten reaches N, the second client is notified that all of the second information has been gotten if YES, and if NO, the second client is allowed to get the second information.

Under the condition that the amount of the second information to be issued is limited, the server is required to track a receiving state of the second information (if the second information is not received, the state is identified to be "not gotten"; and if the second information has been gotten, the state is modified to be "gotten"), and count the second information which has been gotten. If a second information set issued to a certain first client includes 5 pieces of second information, the server is required to determine whether the amount of the second information which has been gotten reaches 5 after receiving a request for getting the second information corresponding to the first information, and if YES, it is indicated that all of the second information corresponding to the first information has been distributed without surplus and may not be continuously distributed, so that a notice indicating that all of the second information has been gotten is issued to a second client which requests; and if NO, it is indicated that not all the second information corresponding to the first information is distributed, there is still some second information not received and the second information may be continuously distributed, so that the second client is allowed to get the second information.

In an implementation mode, the first information and the second information are cash-filled red packets, and the step that the second client is allowed to get the second information includes that:

a transfer charging terminal is notified to execute account transfer processing on an account of a user of the second client, and an amount in the account, stored in the DB of the server, of the user of the second client is correspondingly modified; and a message notifying that the second information is successfully gotten is transmitted to the second client after transfer processing is finished.

The first information and second information in the embodiment of the disclosure may be cash-filled red packets issued by the official account of an enterprise through the server, and then implementation of an acquisition process of the second information requires support of the transfer charging terminal, that is, the transfer charging terminal executes account transfer processing on an account of the user of the second client; and in addition, it is also necessary to correspondingly modify an amount in the account, stored in the DB of the server, of the user of the client. After transfer processing is successfully executed and the account amount, stored in the DB, of the user of the second client is successfully modified, the message notifying that the second information is successfully gotten is transmitted to the second client; and otherwise, a second information receiving failure notification message is transmitted to the second client, and furthermore, a failure cause may be notified.

It is important to note that the first information and second information in the embodiment of the disclosure are not limited to cash-filled red packets and may also be cash coupons, discount coupons, notification information contents issued by official accounts registered by government organizations and enterprises and the like.

By embodiment 1 of the disclosure, the public message issued by the official account through the server carries the first information and the second information set, the first information being information only allowed to be gotten by the first client and the second information being information only allowed to be gotten by the client in the sharing relationship with the first client; and in such an inter-client sharing manner, the message issued to a client by the official account through the server may be propagated to multiple different clients, and the related information carried in the message may be propagated as widely as possible, so that influence of issuing of the public message is expanded.

Embodiment 2

Figure 2:
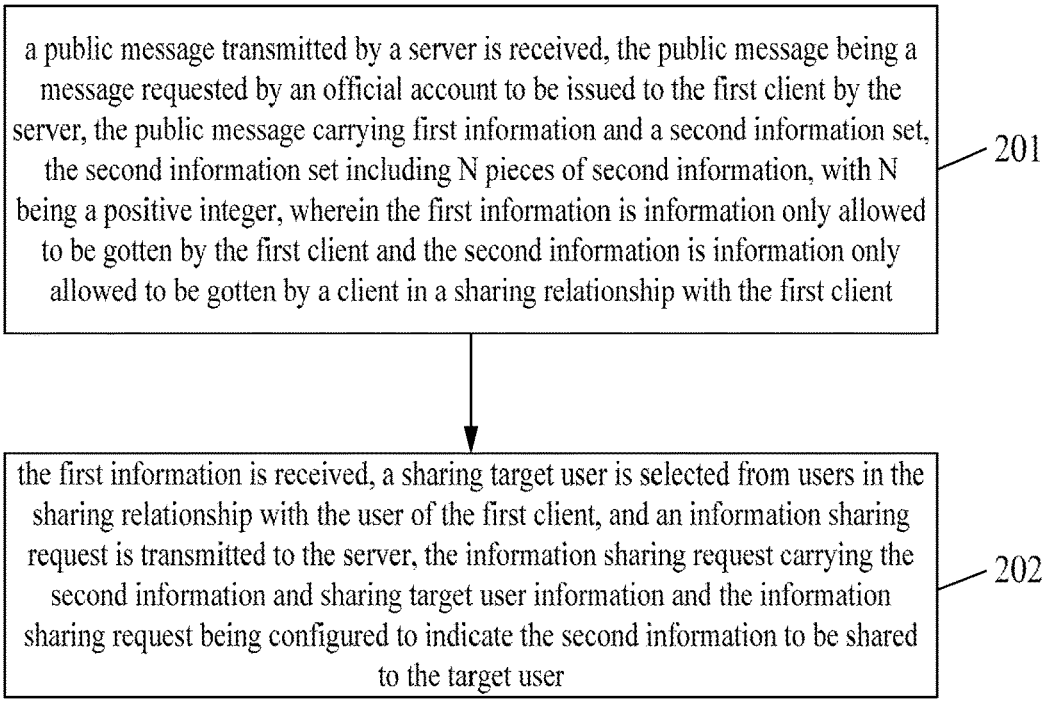
FIG. 2 is a flowchart of an information processing method according to embodiment 2 of the disclosure.

Embodiment 2 of the disclosure provides an information processing method, which is applied to a first client, and as shown in FIG. 2, the method mainly includes the following steps.

Step 201: a public message transmitted by a server is received, the public message being a message requested by an official account to be issued to the first client by the server, the public message carrying first information and a second information set, the second information set including N pieces of second information, with N being a positive integer, wherein the first information is information only allowed to be gotten by the first client and the second information is information only allowed to be gotten by a client in a sharing relationship with the first client.

In an implementation mode, before the step that the public message transmitted by the server is received, the method of embodiment 2 of the disclosure further includes that:

an information request is transmitted to the server for requesting the first information from the server, wherein the information request carries characteristic information of a user of the first client and the characteristic information serves as a basis for the server to determine whether a preset first information issuing condition is matched.

A mode that the official account may only issue the public message to a client with an information acquisition requirement through the server may also be understood as a mode that the client competitively acquires the information; and a large number of clients transmit information requests (for requesting to acquire the public message of the official account) to the server, and the server may screen a client consistent with a preset first information issuing condition (characteristic information of a user of the client is required to match the preset first information issuing condition) as the first client capable of receiving the public message according to the preset first information issuing condition submitted by the official account. For example: if the first information issuing condition is sequential transmitting, the clients may sequentially acquire the information from a certain time point or within a specific time range according to a sequence of the information requests which are received by the server; or, if the first information issuing condition is a geographical position, it is determined whether a geographical position of the client is consistent with the condition according to position information carried in the information request of the client, the client is selected as the first client if YES, and if NO, the client is not selected as the first client.

Step 202: the first information is received, a sharing target user is selected from users in the sharing relationship with the user of the first client, and an information sharing request is transmitted to the server, the information sharing request carrying the second information and information about one or more information-sharing target users, and the information sharing request being configured to indicate the second information to be shared to the target user.

The first client receiving the public message extracts the first information therein, and for the second information therein, the user of the first client is required to select the target user for distribution, the target user being a user (such as a friend user of the user of the first client) in the sharing relationship with the user of the first client; and the first client transmits the information sharing request to the server to request to share the second information to the target user. However, the second information which is shared is required to be requested to the server for reception by one or more clients of the one or more target users.

In an implementation mode, the method of embodiment 2 of the disclosure may further include that: after the information sharing request is transmitted to the server, an information sharing result returned by the server is received, the information sharing result indicating the information of the target user successfully getting the second information.

After the target user successfully receives the second information, the server may generate and transmit the corresponding information sharing result to the first client, and then the user of the first client may learn about the target user successfully getting the second information distributed by the user of the first client.

By embodiment 2 of the disclosure, the public message received by the first client carries the first information and the second information set, the first information being information only allowed to be gotten by the first client and the second information being information only allowed to be gotten by the client in the sharing relationship with the first client; and in such an inter-client sharing manner, the message issued to a client by the official account through the server may be propagated to multiple different clients, and the related information carried in the message may be propagated as widely as possible, so that influence of issuing of the public message is expanded.

Embodiment 3

Figure 3:
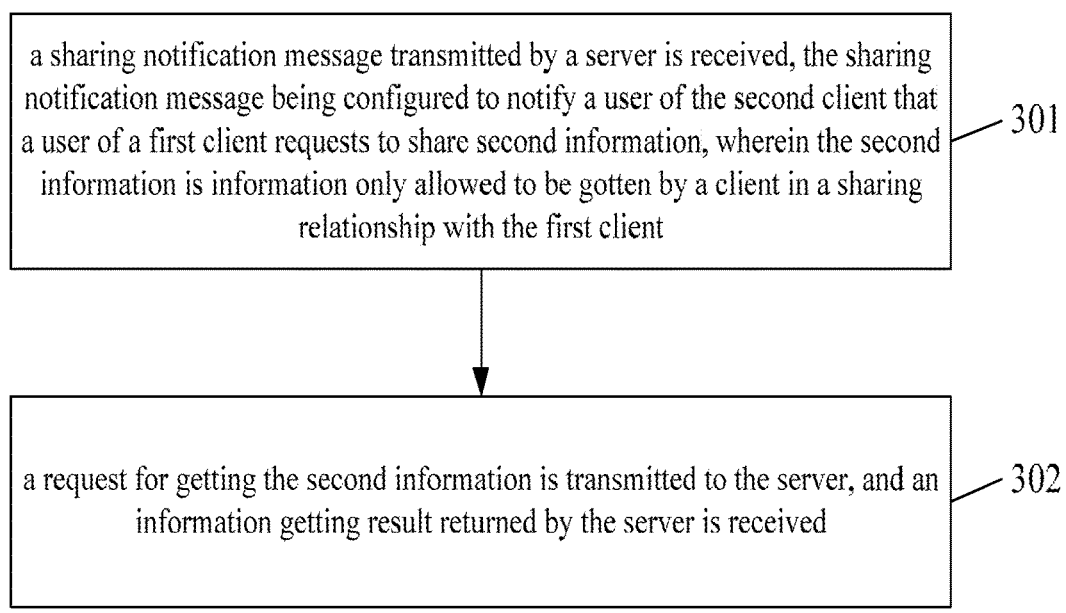
FIG. 3 is a flowchart of an information processing method according to embodiment 3 of the disclosure.

Embodiment 3 of the disclosure provides an information processing method, which is applied to a second client, and as shown in FIG. 3, the method mainly includes:

Step 301: a sharing notification message transmitted by a server is received, the sharing notification message being configured to notify a user of the second client that a user of a first client requests to share second information, wherein the second information is information only allowed to be gotten by a client in a sharing relationship with the first client; and Step 302: a request for getting the second information is transmitted to the server, and an information getting result returned by the server is received.

The second client may learn about that the first client shares the second information to it after receiving the sharing notification message transmitted by the server, but the second client is required to request to the server, and may successfully receive the second information only after the server determines that a user of the second client is consistent with a distribution condition.

If the second client is verified to be in the sharing relationship with the first client and there is still some second information not received when the server receives the request for getting the second information of the second client, the second client receives an information receiving success result; and otherwise, the second client receives an information receiving failure result.

By embodiment 3 of the disclosure, the second information received by the second client is information distributed by the first client (issued to the first client by the server), and the first client may only distribute the second information to the client in the sharing relationship therewith; and in such an inter-client sharing manner, the message issued to a client by an official account through the server may be propagated to multiple different clients, and the related information carried in the message may be propagated as widely as possible, so that influence of issuing of the public message is expanded.

Embodiment 4

Figure 4:
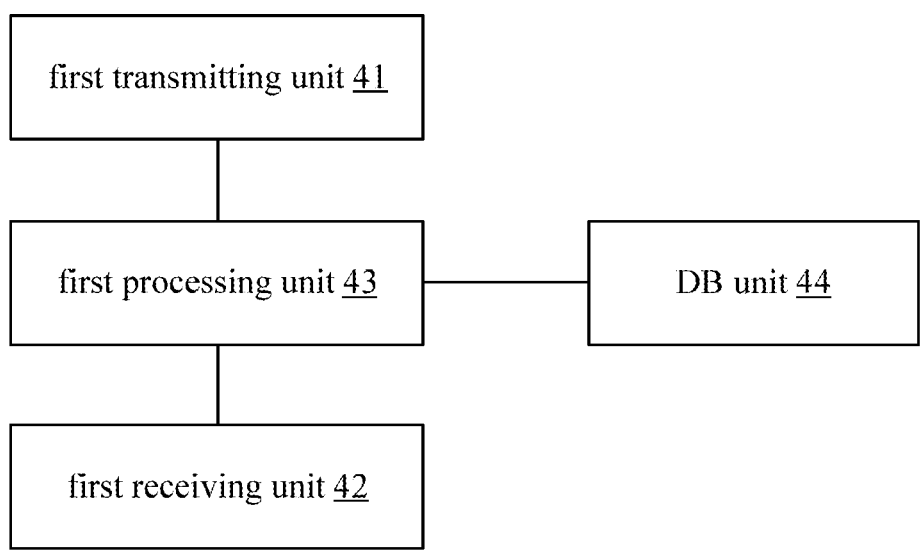
FIG. 4 is a structure diagram of a server according to embodiment 4 of the disclosure.

Corresponding to the information processing method of embodiment 1 of the disclosure, embodiment 4 of the disclosure provides a server, and as shown in FIG. 4, the server mainly includes:

a first transmitting unit 11 configured to transmit a public message to a first client, the public message being a message issued to the first client by the server, the public message carrying first information and a second information set, the second information set including N pieces of second information, with N being a positive integer, wherein the first information is information only allowed to be gotten by the first client and the second information is information only allowed to be gotten by a client in a sharing relationship with the first client;

a first receiving unit 12 configured to receive a request for getting the second information from a second client; and a first processing unit 13 configured to, after the first receiving unit 12 receives the request for getting the second information from the second client, verify whether the second client is in the sharing relationship with the first client, and after determining that the second client is in the sharing relationship with the first client, allow the second client to get the second information.

In an implementation mode, after the first transmitting unit 11 transmits the public message to the first client and before the first receiving unit receives the request for getting the second information from the second client, the first receiving unit 12 is further configured to:

receive an information sharing request transmitted by the first client, the information sharing request carrying the second information and information about one or more information-sharing target users, and the information sharing request being configured to indicate the second information to be shared to a target user;

the first processing unit 13 is further configured to extract the second information and the information about target users in the information sharing request, generate a sharing notification message according to the extracted information, and provide the sharing notification message for the first transmitting unit 11; and the first transmitting unit 11 is further configured to transmit the sharing notification message to one or more clients of the one or more target users, the sharing notification message being configured to notify the target users that a user of the first client requests to share the second information.

In an implementation mode, the first receiving unit 13 is further configured to, before the first transmitting unit 11 transmits the public message to the first client, receive information requests from multiple clients, the information requests carrying characteristic information of respective users of the clients; and the first processing unit 13 is further configured to select, from the clients transmitting the information requests, a client, characteristic information of which matches a preset first information issuing condition, as the first client.

In an implementation mode, the server further includes a DB unit 14 configured to maintain a corresponding relationship between the first information and the second information set, and count the second information which has been gotten; and the first processing unit 13 is further configured to, after determining that the second client is in the sharing relationship with the first client, determine whether the amount of the second information which has been gotten reaches N according to a record in the DB unit 14, notify the second client that all of the second information has been gotten through the first transmitting unit 11 if YES, and if NO, allow the second client to get the second information.

In an implementation mode, the first information and the second information are cash-filled red packets, and the operation that the first processing unit 13 allows the second client to get the second information includes:

notifying a transfer charging terminal to execute account transfer processing on an account of a user of the second client, and correspondingly modifying an amount in the account, stored in a DB of the server, of the user of the second client; and transmitting a message notifying that the second information is successfully gotten to the second client through the first transmitting unit 11 after transfer processing is finished.

In an implementation mode, the first processing unit 13 is further configured to verify whether the second client is in the sharing relationship with the first client in a manner of:

acquiring user information of the first client and information about users sharing information with a user of the first client, and acquiring user information of the second client; and searching whether the information about the users sharing information with the user of the first client includes the user information of the second client, determining that the second client is in the sharing relationship with the first client if YES, and if NO, determining that the second client is not in the sharing relationship with the first client.

It is important to note that the first transmitting unit 11 and the first receiving unit 12 may be implemented by a transceiver chip of the server, the first processing unit 13 may be implemented by a Central Processing Unit (CPU), Micro Processing Unit (MPU), Digital Signal Processor (DSP) or Field-Programmable Gate Array (FPGA) of the server, and the DB unit 14 may be implemented by storage hardware of the server.

Embodiment 5

Figure 5:
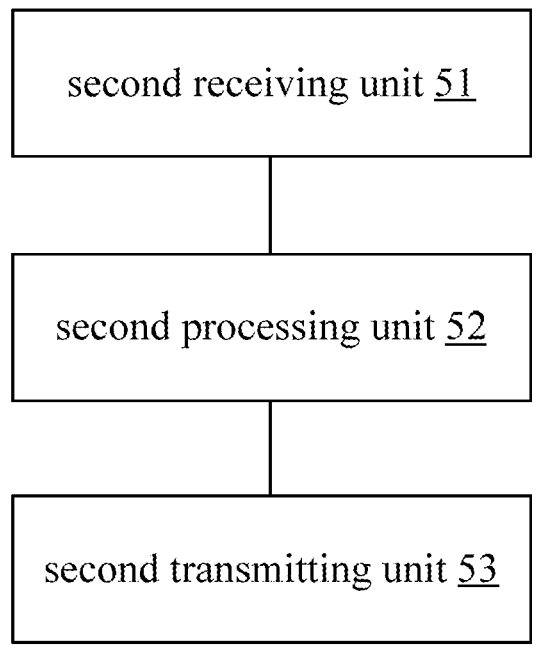
FIG. 5 is a structure diagram of a first client according to embodiment 5 of the disclosure.

Corresponding to the information processing method of embodiment 2 of the disclosure, embodiment 5 of the disclosure provides a first client, and as shown in FIG. 5, the first client mainly includes:

a second receiving unit 51 configured to receive a public message transmitted by a server, the public message being a message requested by an official account to be issued to the first client by the server, the public message carrying first information and a second information set, the second information set including N pieces of second information, with N being a positive integer, wherein the first information is information only allowed to be gotten by the first client and the second information is information only allowed to be gotten by a client in a sharing relationship with the first client;

a second processing unit 52 configured to receive the first information, and select a sharing target user from users in the sharing relationship with a user of the first client; and a second transmitting unit 53 configured to transmit and an information sharing request to the server, the information sharing request carrying the second information and information about one or more information-sharing target users, and the information sharing request being configured to indicate the second information to be shared to the target user.

In an implementation mode, the second receiving unit 51 is further configured to, after the second transmitting unit 53 transmits the information sharing request to the server, receive an information sharing result returned by the server, the information sharing result indicating the information of the target user successfully getting the second information.

In an implementation mode, the second transmitting unit 53 is further configured to, before the second receiving unit 51 receives the public message transmitted by the server, transmit an information request to the server for requesting the first information from the server, wherein the information request carries characteristic information of the user of the first client and the characteristic information serves as a basis for the server to determine whether a preset first information issuing condition is matched.

It is important to note that the second receiving unit 51 and the second transmitting unit 53 may be implemented by a transceiver chip of the first client, and the second processing unit 52 may be implemented by a CPU, MPU, DSP or FPGA of the first client.

Embodiment 6

Figure 6:
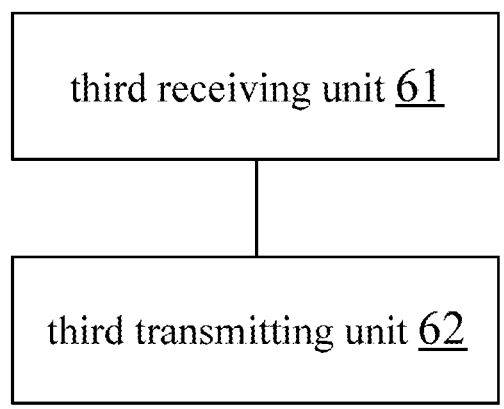
FIG. 6 is a structure diagram of a second client according to embodiment 6 of the disclosure.

Corresponding to the information processing method of embodiment 3 of the disclosure, embodiment 6 of the disclosure provides a second client, and as shown in FIG. 6, the second client mainly includes:

a third receiving unit 61 configured to receive a sharing notification message transmitted by a server, the sharing notification message being configured to notify a user of the second client that a user of a first client requests to share second information, wherein the second information is information only allowed to be gotten by a client in a sharing relationship with the first client; and a third transmitting unit 62 configured to transmit a request for getting the second information to the server, the third receiving unit 61 being further configured to receive an information getting result returned by the server.

If the second client is verified to be in the sharing relationship with the first client and there is still some second information not received when the server receives the request for getting the second information of the second client, the third receiving unit 61 receives an information receiving success result; and otherwise, the third receiving unit 61 receives an information receiving failure result.

It is important to note that the third receiving unit 61 and the third transmitting unit 62 may be implemented by a transceiver chip of the second client.

It is important to note that the first information and second information in the embodiment of the disclosure may be notification information contents issued by official accounts registered by government organizations and enterprises, and may also be cash-filled red packets, cash coupons, discount coupons and the like issued by the official accounts registered by the government organizations and the enterprises. The information processing method of the embodiment of the disclosure will be elaborated below with the condition that the first information and the second information are cash-filled red packets and the first client and the second client are WeChat clients as an example in detail.

Embodiment 7

Figure 7:
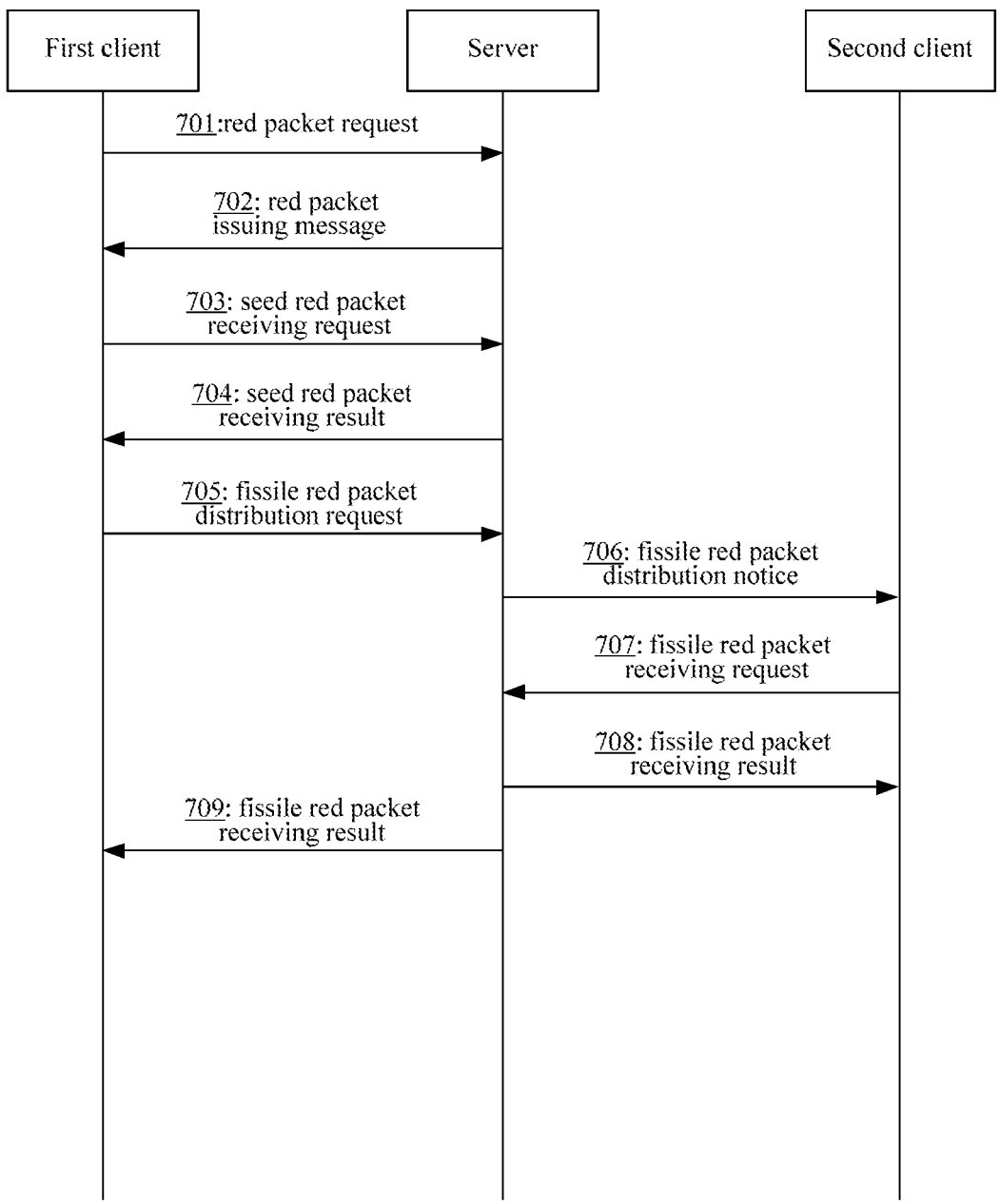
FIG. 7 is a first flowchart of an information processing method according to embodiment 7 of the disclosure.

Embodiment 7 of the disclosure provides an information processing method for distribution of cash-filled red packets of an enterprise, and as shown in FIG. 7, the method mainly includes the following steps.

Step 701: a first client transmits a red packet request to a WeChat server to request the WeChat server for a red packet, wherein the red packet request carries characteristic information of a user of the first client.

In the embodiment, the characteristic information of the user may include a user identifier, geographical position information of the user and the like; and the user may transmit the red packet request to the WeChat server through a "shake" function of the first client, and a sensor in the first client may trigger generation of the corresponding red packet request after acquiring a "shake" action of the user.

Step 702: the WeChat server receives the red packet request of the client, and performs matching with a preset red packet issuing condition according to the characteristic information of the user in the red packet request, the red packet issuing condition in the embodiment being acquisition based on arrival time sequence of users within a preset geographical position range, wherein the WeChat server screens red packet requests of the users of which geographical positions are in the preset geographical position range at first according to a large number of received red packet requests, and then preferably distributes red packets to the red packet requests which are received earlier in the other red packet requests according to a sequence of the red packet requests which are received by the WeChat server (that is, a client of which the red packet request is received earlier may be preferably selected as the first client); and then, the WeChat server transmits a public message to the first selected which is selected, the public message in the embodiment being a red packet issuing message, the red packet issuing message carrying a seed red packet (i.e. first information) and N fissile red packets (i.e. second information) and a value of N in the embodiment being supposed to be 5, wherein the seed red packet is a red packet only allowed to be gotten by the first client, and the fissile red packets are red packets only allowed to be gotten by a client in a sharing relationship with the first client.

Step 703: the first client transmits a seed red packet receiving request to the WeChat server after receiving the red packet issuing message from the WeChat server.

Figure 9:
FIG. 9 is a first diagram of a client interface according to embodiment 7 of the disclosure.

FIG. 9 is a diagram of a display interface of the first client after the first client in the embodiment receives the red packet issuing message from the WeChat server. In FIG. 9, it is displayed in the interface that a certain enterprise issues a Chinese New Year red packet to its user, the first client learns about that the user requests to receive the Chinese New Year red packet if the user clicks a button "open red packet" in the interface, and then the first client may generate and transmit a seed red packet receiving request to the WeChat server. It is important to note that the user does not know there is fissile red packets in the red packet before the user clicks the button "open red packet" in the interface.

Figure 10:
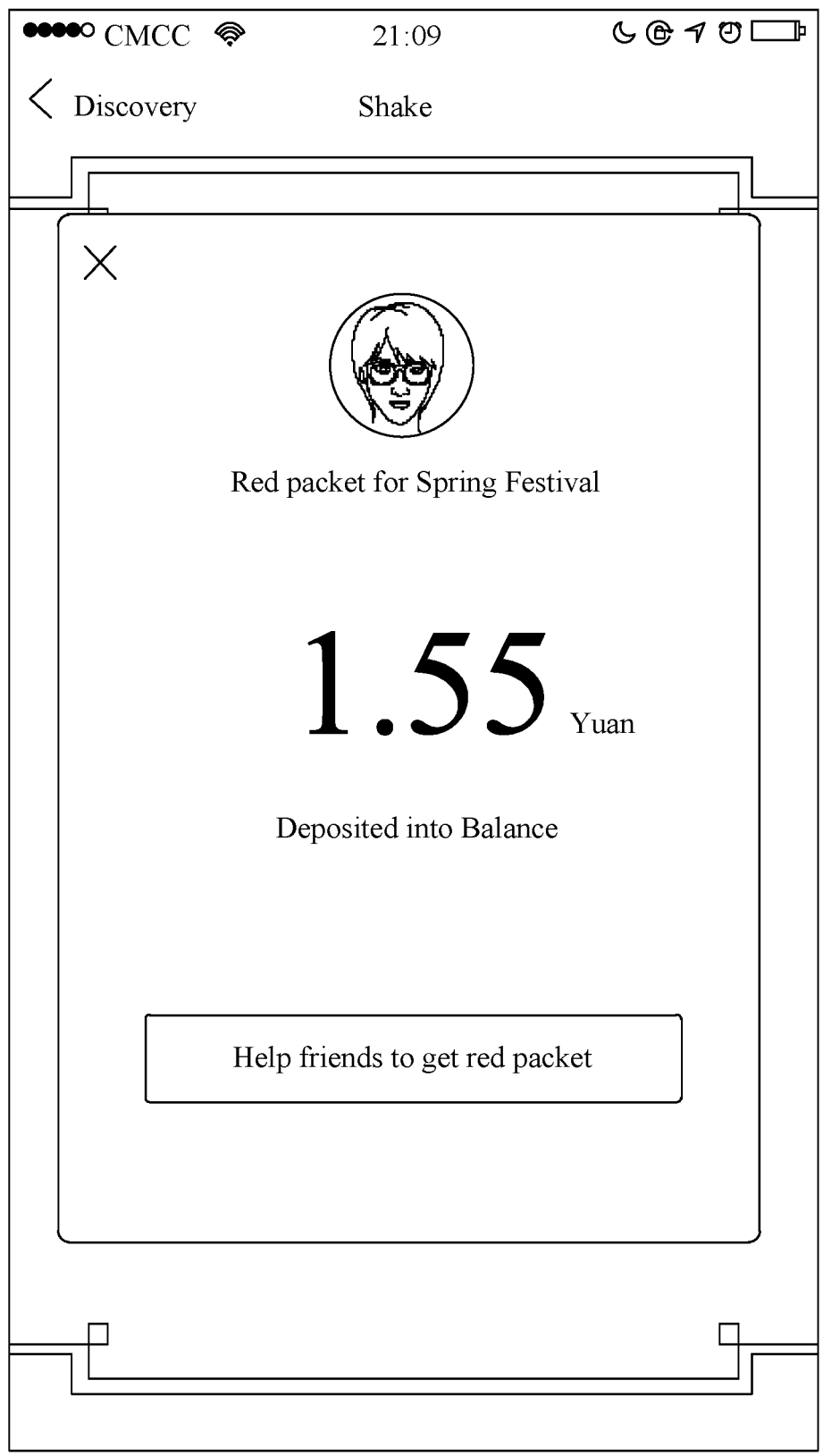
FIG. 10 is a second diagram of a client interface according to embodiment 7 of the disclosure.

Step 704: the WeChat server performs receiving right verification on the first client, for example, determining whether a user of the first client is a user the red packet is allowed by the WeChat server to be issued to, when receiving the seed red packet receiving request from the first client, and if the first client passes verification, executes seed red packet issuing processing on the first client and returns a seed red packet receiving result to the first client after finishing processing, FIG. 10 showing a diagram of the interface after the first client receives the result and the interface displaying an amount of a red packet received by the user of the first client and prompting the user of the first client to distribute the fissile red packets to friends through a prompting button "help friends to receive red packets"; and if the first client does not pass verification, the WeChat server denies to issue the seed red packet to the first client, and returns a seed red packet receiving result (including a denial reason) to the first client.

Wherein, since red packet reception of the user involves modification of a cash account of the user implementation of red packet reception requires the server to notify a transfer charging terminal to execute account transfer processing on an account of the user of the first client, and the amount, stored in a DB of the account of the user of the first client is correspondingly modified.

Step 705: when the first client learns about that the user triggers distribution of the fissile red packets to the friends, the first client generates and transmits a fissile red packet distribution request to the WeChat server.

Figure 11:
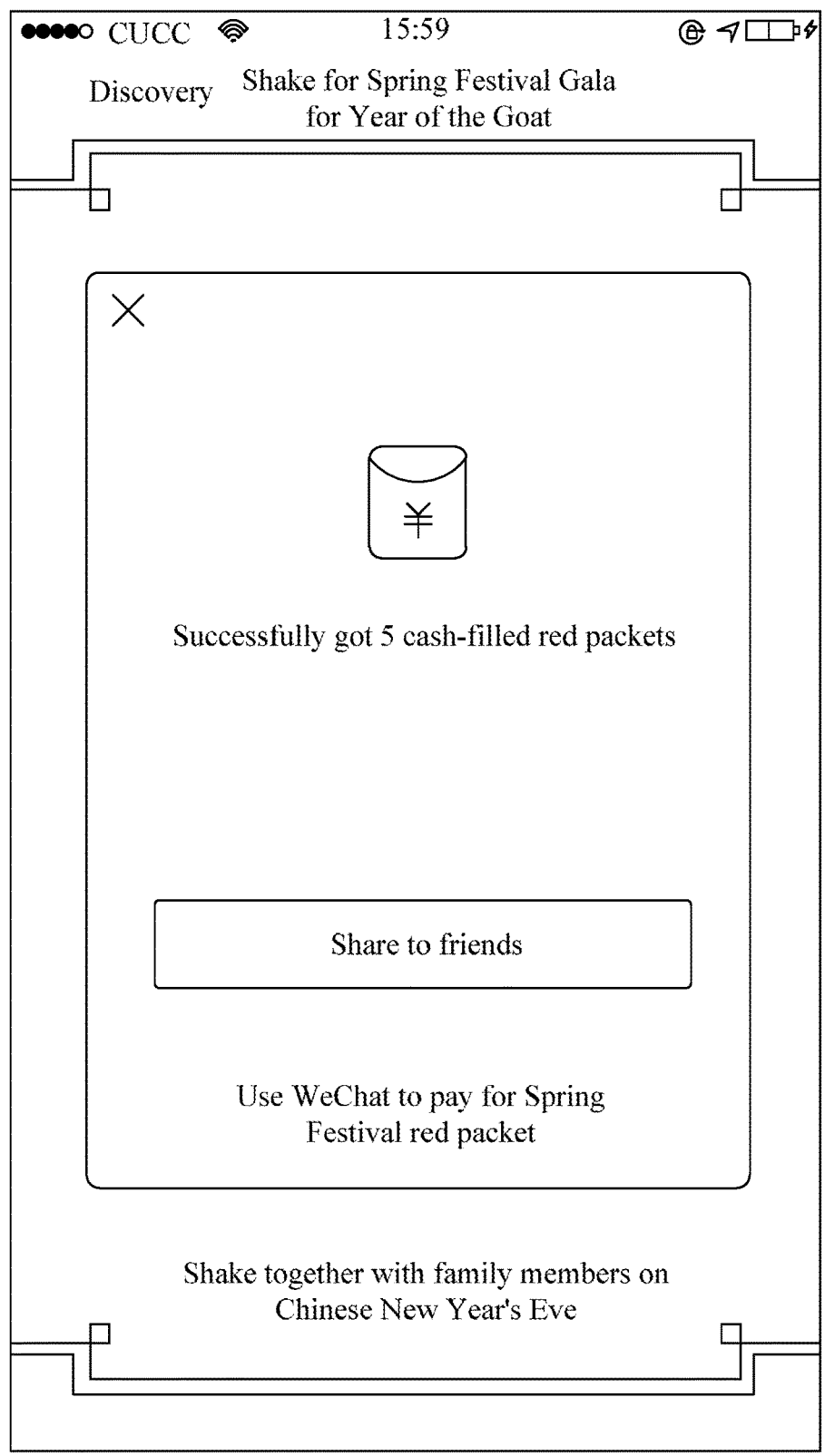
FIG. 11 is a third diagram of a client interface according to embodiment 7 of the disclosure.
Figure 12:
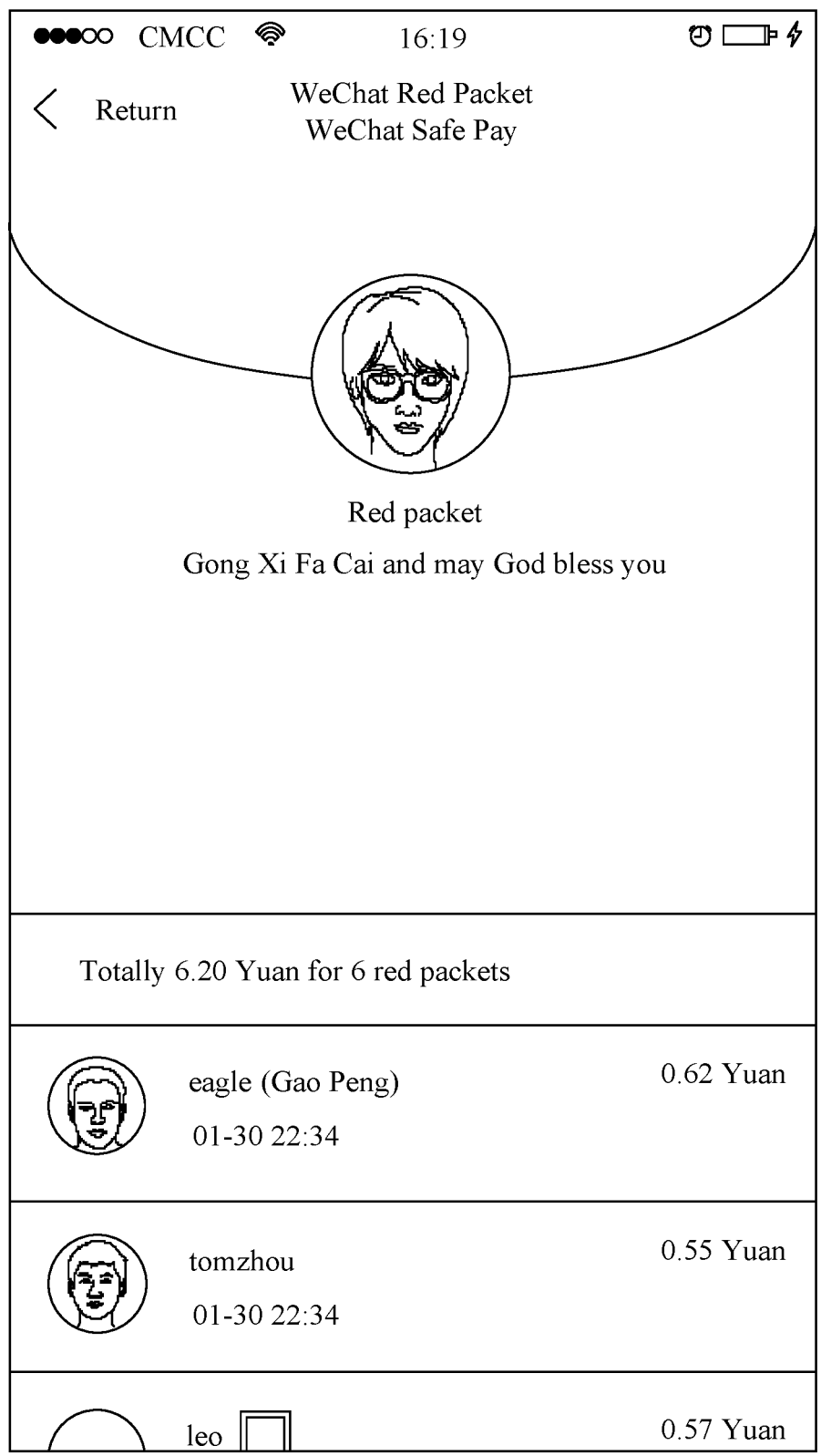
FIG. 12 is a fourth diagram of a client interface according to embodiment 7 of the disclosure.

Referring to FIG. 10 and FIG. 11, if the user clicks the button "help friends to receive red packets" in FIG. 10 to enter an interface shown in FIG. 11, the interface prompts the user to obtain 5 fissile red packets, and if the user clicks a button "share to friends" in FIG. 11, the first client may call a friend list of the user for the user to select sharing target friends; and an interface after the user finishes selecting the sharing target friends is shown in FIG. 12, it is important to note that amounts of each fissile red packet in the 5 fissile red packets may be preset, the amounts of each fissile red packet in the 5 fissile red packets may also be set by the user of the first client of course, the WeChat server is only required to predetermine the total amount of the 5 fissile red packets when issuing the public message, the user of the first client is required to ensure that the total amount does not exceed the predetermined total amount when allocating the amounts of the 5 fissile red packets, otherwise the fissile red packets may not be successfully shared.

Step 706: the WeChat server transmits corresponding fissile red packet distribution notices to corresponding second clients according to the received fissile red packet distribution request.

The fissile red packet distribution request indicates the distribution target users, the amounts of the fissile red packets and the user identifier of the first client, and the fissile red packet distribution notices also carry the information.

Step 707: after the second clients receive the fissile red packet distribution notices transmitted by the WeChat server, if users of the second clients trigger reception of the fissile red packets, the second clients transmit fissile red packet receiving requests to the WeChat server.

Step 708: the WeChat server is required to verify whether the second clients are in a sharing relationship with the first client after receiving the fissile red packet receiving requests of the second clients, and after determining that the second clients are in the sharing relationship with the first client, allows the second clients to receive the fissile red packets.

Specifically, the WeChat server acquires the user information of the first client and information about users sharing information with a user of the first client, acquires user information of the second clients, determines whether the users of the second clients are friend users of the user of the first client according to the user information of the second clients, determines that the second clients are in the sharing relationship with the first client if YES, and if NO, determines that the second clients are not in the sharing relationship with the first client.

Wherein, the operation that the WeChat server allows the second clients to receive the fissile red packets requires the following support:

the transfer charging terminal executes account transfer processing on an account of the users of the second clients, and account amounts, stored in the DB of the server, of the users of the second clients are correspondingly modified.

The WeChat server returns fissile red packet receiving results to the second clients after finishing processing no matter whether successfully allocating the red packets to the second clients, returns fissile red packet receiving success results when successfully allocating the red packets, returns fissile red packet receiving failure results when failing to allocate the red packets, and may notify a failure reason such as no red packet surplus.

Step 709: the WeChat server also transmits a fissile red packet receiving result to the first client to notify the second clients which successfully receive the fissile red packets distributed by the first client to the user of the first client, and the WeChat server may also notify details about red packet reception failures of the target users specified by the first client to the first client.

It is important to note that embodiment 7 of the disclosure is described with the condition that the first client distributes the fissile red packets to single or multiple friends as an example; and in a practical implementation process, the first client may also transmit the fissile red packets to a WeChat session group and the circle of friends for sharing, and in such an environment, users of the session group and the circle of friends grab the red packets in a competition manner, and receive the red packets according to a time sequence. In addition, for the condition that the first client transmits the fissile red packets to the WeChat session group, the WeChat server is only required to determine whether the users of the second clients are users in the corresponding WeChat session group when verifying whether the second clients are in the sharing relationship with the first client (the users in the WeChat session group may not be friends of the first client), and if the users of the second clients are the users in the corresponding WeChat session group, determines whether the second clients are in the sharing relationship with the first client, otherwise determines that the second clients are not in the sharing relationship with the first client. Moreover, the fissile red packets in the embodiment of the disclosure are not allowed to be forwarded by the second clients.

Embodiment 8

Figure 8A:
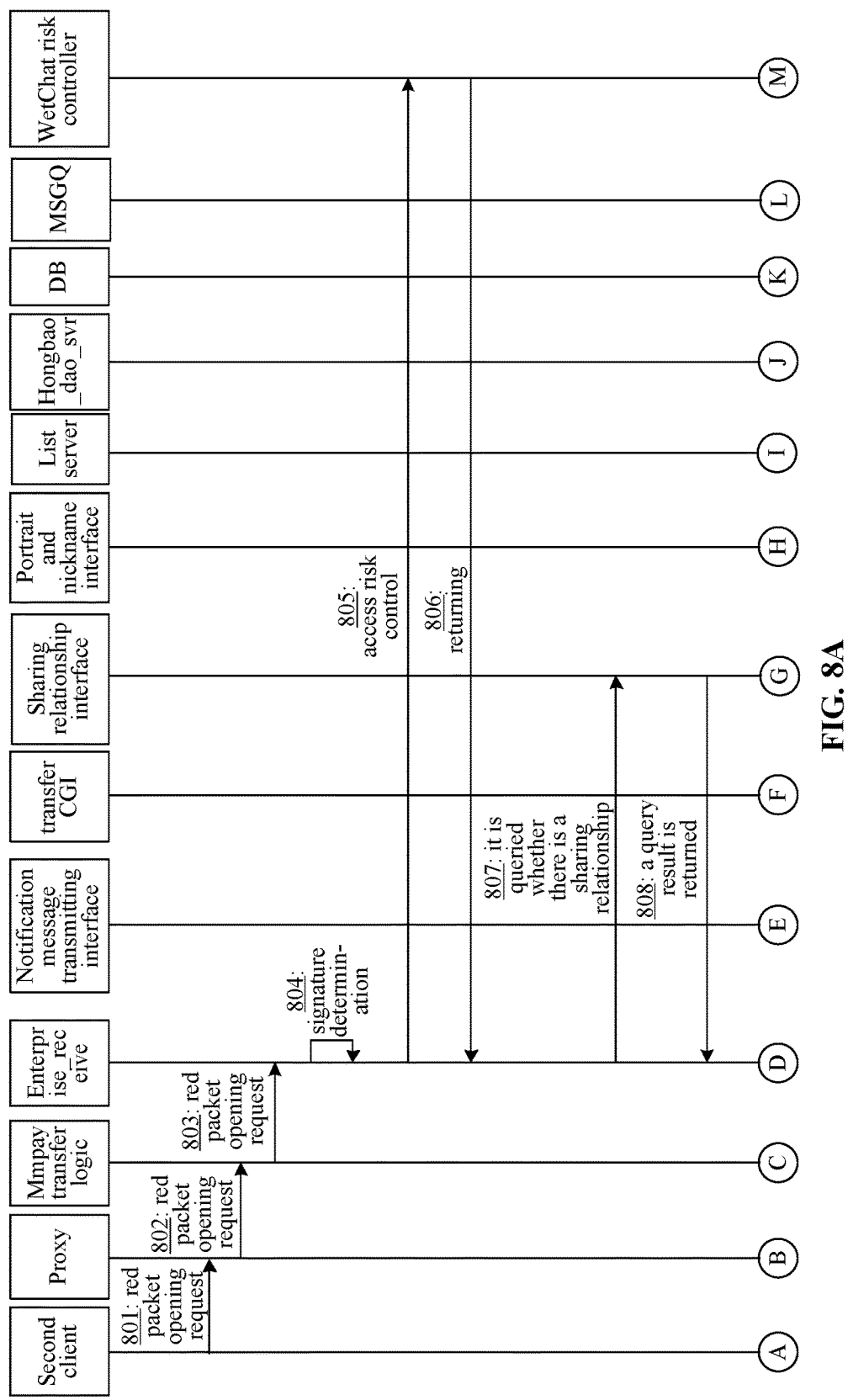
FIG. 8A is a first portion of a second flowchart of an information processing method according to embodiment 7 of the disclosure.
Figure 8B:
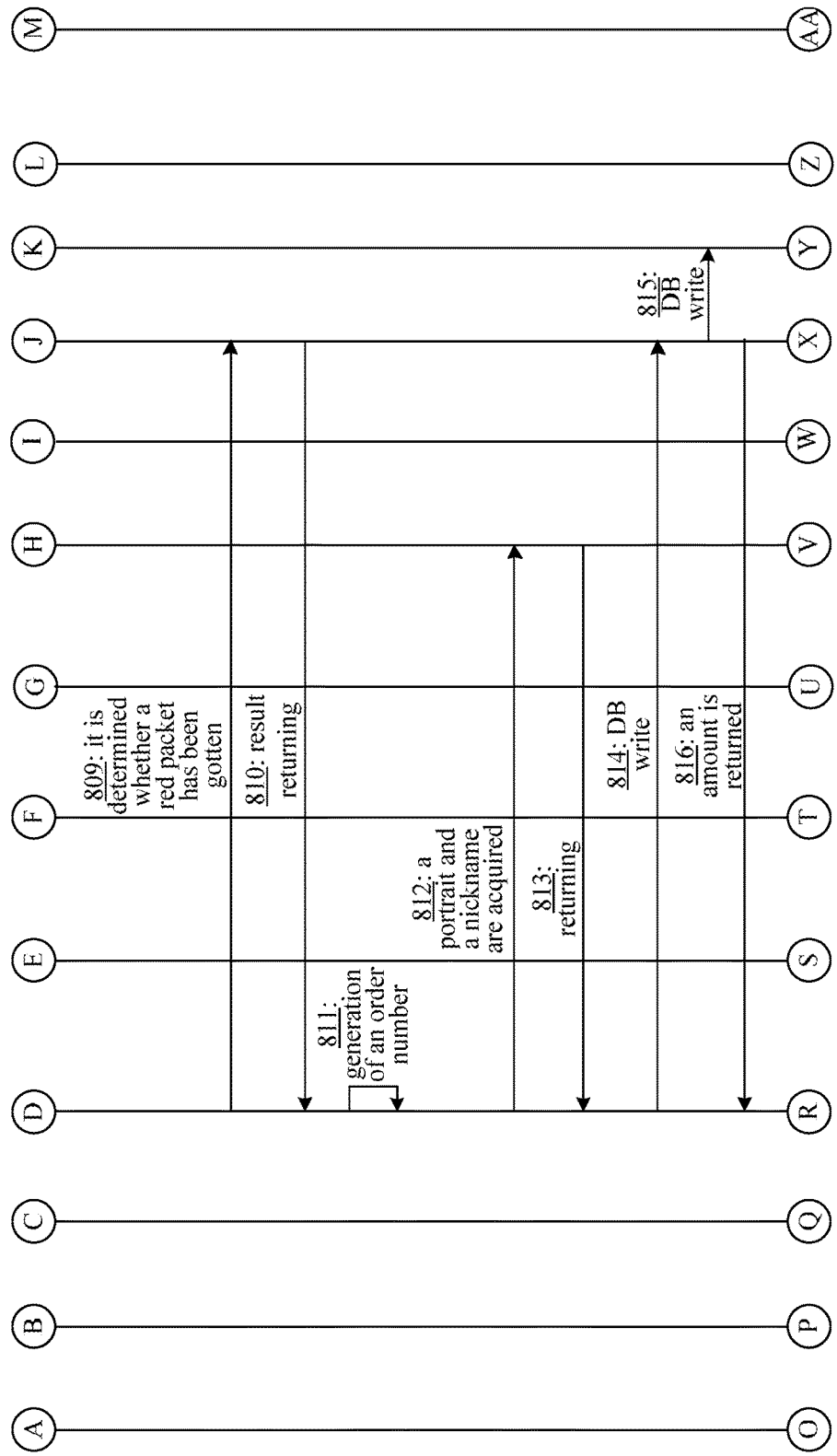
FIG. 8B is a second portion of the second flowchart of the information processing method according to embodiment 7 of the disclosure.
Figure 8C:
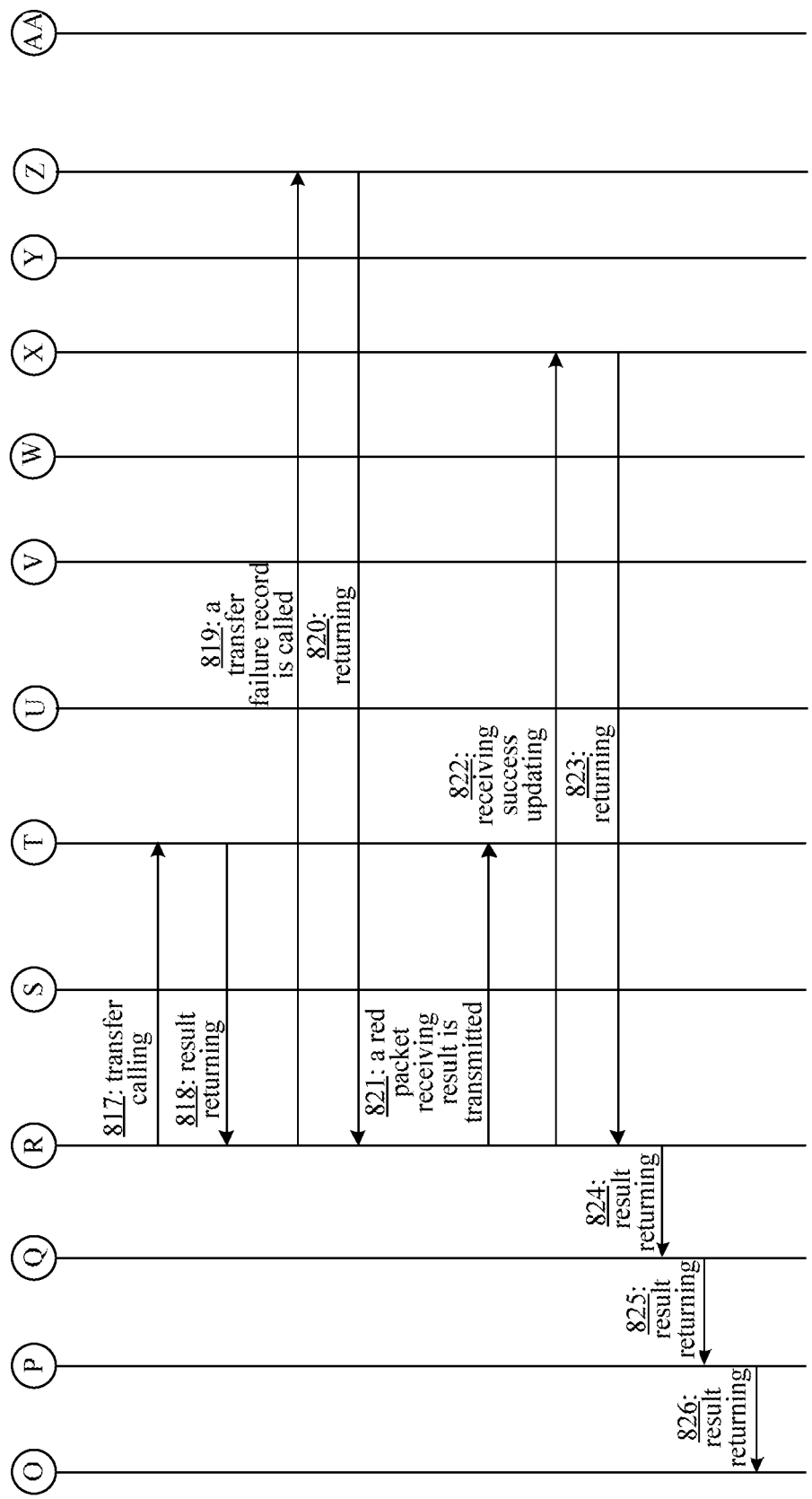
FIG. 8C is a third portion of the second flowchart of the information processing method according to embodiment 7 of the disclosure.

Embodiment 8 of the disclosure further elaborates a process implemented by Step 707-709 in embodiment 7 in detail. As shown in FIG. 8A, FIG. 8B and FIG. 8C, embodiment 8 mainly includes:

Step 801-803: a second client sequentially transmits a red packet opening request to Enterprise_receive through a proxy and Mmpaytransferlogic;

Step 804: Enterprise_receive determines a user signature of the second client;

Step 805-806: Enterprise_receive accesses a WeChat risk controller for risk evaluation, and receives a result returned by the WeChat risk controller;

Step 807: after the second client passes risk evaluation, Enterprise_receive queries whether the second client is in a sharing relationship with a first client from a sharing relationship interface, wherein a specific query method has been introduced in the abovementioned embodiments, and will not be elaborated herein;

Step 808: the sharing relationship interface returns a sharing relationship query result to Enterprise_receive;

Step 809-810: when determining that the second client is in the sharing relationship with the first client, Enterprise_receive determines whether the second client has received a corresponding fissile digital re a result indicating that the second information is unsuccessfully gotten d envelope through a list server, and receives a result returned by the list server;

Step 811: when it is determined that the second client has yet not received the corresponding fissile red packet and the corresponding fissile red packet is left, Enterprise_receive generates a corresponding order number;

Step 812-813: Enterprise_receive acquires a portrait and nickname of a user of the second client from a portrait and nickname interface, and receives a result returned by the portrait and nickname interface;

Step 814: Enterprise_receive transmits a DB write request to Hongbao_dao_svr;

Step 815: Hongbao_dao_svr transmits the DB write request to a DB;

Step 816: after finishing DB write, the Hongbao_dao_svr returns an amount written in the DB to Enterprise_receive;

Step 817-818: Enterprise_receive calls a transfer Computer Graphics Interface (CGI) to execute transfer processing, and receives a transfer result returned by the transfer CGI;

Step 819-820: in case of a transfer failure of the transfer CGI, a transfer failure record of an Message Queue (MSGQ) is called, and a result returned by the MSGQ is received;

Step 821: Enterprise_receive calls a notification message transmitting interface to transmit a red packet receiving result;

Step 822-823: Enterprise_receive transmits a receiving success updating message to the list server, and the list server modifies, a state of the corresponding fissile red packet, to be "gotten", and counts fissile red packets which have been received; and Step 824-826: Enterprise_receive sequentially returns the red packet receiving result to the second client through Mmpaytransferlogic and the proxy.

From the above, in the embodiment of the disclosure, the public message issued by the official account through the server carries the first information and the second information set, the first information being information only allowed to be gotten by the first client and the second information being information only allowed to be gotten by the client in the sharing relationship with the first client; and in such an inter-client sharing manner, the message issued to a client by the official account through the server may be propagated to multiple different clients, and the related information carried in the message may be propagated as widely as possible, so that influence of issuing of the public message is expanded. In addition, in the embodiment of the disclosure, the first client shares the second information in the public message rather than a similar public message page such as a content notification page, a resource distribution page and a public activity page to the second client through the server, that is, the first client shares a second information content rather than the public message page such as the content notification page, the resource distribution page and the public activity page, so that the content may be shared more directly and conveniently.

Those skilled in the art should know that the embodiment of the disclosure may be provided as a method, a system or a computer program product. Therefore, the disclosure may adopt a form of hardware embodiment, software embodiment and combined software and hardware embodiment. Moreover, the disclosure may adopt a form of computer program product implemented on one or more computer-available storage media (including, but not limited to a disk memory, an optical memory and the like) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams. The embodiment provides a computer-readable storage medium, which includes a set of instructions, the instructions being executed to cause at least one processor to execute the following operation of:

transmitting a public message to a first client, the public message being a message issued to a first client by a server and the public message carrying first information and a second information set, wherein the second information set includes N pieces of second information, N is a positive integer, the first information is information only allowed to be gotten by the first client and the second information is information only allowed to be gotten by a client in a sharing relationship with the first client; and receiving a request for getting the second information from a second client, verifying whether the second client is in the sharing relationship with the first client, and after determining that the second client is in the sharing relationship with the first client, allowing the second client to get the second information.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiment of the disclosure and not intended to limit the scope of protection of the disclosure.

What is claimed is:

1. An information processing method, applied to a server, the method comprising:
   receiving a preset condition and a public message submitted by an official account, the preset condition being used for selecting a first client, and the public message being a message requested by the official account to be issued to the first client by the server;
   receiving information requests transmitted from multiple competing clients, the information requests carrying characteristic information of respective users of the multiple competing clients, the characteristic information of respective users comprising geographical position information of the respective users;
   selecting the first client from the multiple competing clients according to the preset condition, wherein the characteristic information of the user of the first client matches the preset condition;
   transmitting the public message to the first client, the public message carrying first information and a second information set, wherein the second information set comprises N pieces of second information, with N being a positive integer, the first information is only allowed to be realized by the first client and the second information is only allowed to be realized by a client in a sharing relationship with the first client;

receiving an information sharing request transmitted by the first client, the information sharing request carrying the second information and information about one or more target users, and the information sharing request being configured to indicate that the second information is to be shared to the target users;

extracting the second information and the information about the one or more target users in the information sharing request, generating a sharing notification message according to the extracted second information and the extracted information about the one or more target users, and transmitting the sharing notification message to one or more clients of the one or more target users, the sharing notification message being configured to notify the one or more target users that a user of the first client requests to share the second information;

receiving a request for getting the second information from a second client, verifying whether the second client is in the sharing relationship with the first client, and after the second client is determined to be in the sharing relationship with the first client, allowing the second client to realize the second information;

wherein a corresponding relationship between the first information and the second information set is maintained in a Data Base (DB) of the server, and the second information which has been realized is counted;

after the second client is determined to be in the sharing relationship with the first client, determining whether the amount of the second information which has been realized reaches N, notifying the second client that all of the second information has been realized if the amount reaches N, and if the amount doesn't reach N, allowing the second client to realize the second information; and wherein the first information and the second information are cash-filled red packets issued by the official account, and allowing the second client to realize the second information comprises:

notifying a transfer charging terminal to execute transfer processing on an account of a user of the second client, and correspondingly modifying an amount in the account, stored in the DB of the server, of the user of the second client, and transmitting a message notifying that the second information is successfully realized to the second client after the transfer processing is finished.

2. The information processing method according to claim 1, wherein verifying whether the second client is in the sharing relationship with the first client comprises:

acquiring user information of the first client and information about users sharing information with a user of the first client, and acquiring user information of the second client; and searching whether the information about the users sharing information with the user of the first client comprises the user information of the second client, determining that the second client is in the sharing relationship with the first client if YES, and if NO, determining that the second client is not in the sharing relationship with the first client.

3. A server, comprising:

a processor; and a memory storing one or more instructions for execution by the processor, the one or more instructions including:

instructions for receiving a preset condition and a public message submitted by an official account, the preset condition being used for selecting a first client, and the public message being a message requested by the official account to be issued to the first client by the server;

instructions for receiving information requests transmitted from multiple competing clients, the information requests carrying characteristic information of respective users of the multiple competing clients, the characteristic information of respective users comprising geographical position information of the respective users;

instructions for selecting the first client from the multiple competing clients according to the preset condition, wherein characteristic information of the user of the first client matches the preset condition;

instructions for transmitting the public message to the first client, the public message carrying first information and a second information set, the second information set comprising N pieces of second information, with N being a positive integer, wherein the first information is only allowed to be realized by the first client and the second information is only allowed to be realized by a client in a sharing relationship with the first client;

instructions for receiving an information sharing request transmitted by the first client, the information sharing request carrying the second information and information about one or more target users, and the information sharing request being configured to indicate that the second information is to be shared to the one or more target users;

instructions for extracting the second information and the information about the one or more target users in the information sharing request, and generating a sharing notification message according to the extracted information;

instructions for transmitting the sharing notification message to one or more clients of the one or more target users, the sharing notification message being configured to notify the one or more target users that a user of the first client requests to share the second information;

instructions for receiving a request for getting the second information from a second client;

instructions for verifying whether the second client is in the sharing relationship with the first client, and after the second client is determined to be in the sharing relationship with the first client, allowing the second client to realize the second information;

wherein a corresponding relationship between the first information and the second information set is maintained in a Data Base (DB) of the server, and the second information which has been realized is counted;

wherein the one or more instructions further comprise instructions for, after it is determined that the second client is in the sharing relationship with the first client, determining whether the amount of the second information which has been realized reaches N, notifying the second client that all of the second information has been realized if the amount reaches N, and if the amount doesn't reach N, allowing the second client to realize the second information; and wherein the first information and the second information are cash-filled red packets issued by the public account, and the instructions for allowing the second client to realize the second information comprise:
  instructions for notifying a transfer charging terminal to execute transfer processing on an account of a user of the second client, and correspondingly modifying an amount in the account, stored in a DB of the server, of the user of the second client, and
  instructions for transmitting a message notifying that the second information is successfully realized to the second client after the transfer processing is finished.

4. The server according to claim 3, wherein instructions for verifying whether the second client is in the sharing relationship with the first client comprise:
  instructions for acquiring user information of the first client and information about users sharing information with a user of the first client, and acquiring user information of the second client; and
  instructions for searching whether the information about the users sharing information with the user of the first client comprises the user information of the second client, determining that the second client is in the sharing relationship with the first client if YES, and if NO, determining that the second client is not in the sharing relationship with the first client.

5. A non-transitory computer-readable storage medium, comprising a set of instructions that, when executed, cause at least one processor to execute the following operations of:
  receiving a preset condition and a public message submitted by an official account, the preset condition being used for selecting a first client, and the public message being a message requested by the official account to be issued to the first client;
  receiving information requests transmitted from multiple competing clients, the information requests carrying characteristic information of respective users of the multiple competing clients, the characteristic information of respective users comprising geographical position information of the respective users;
  selecting the first client from the multiple competing clients according to the preset condition, wherein characteristic information of the user of the first client matches the preset condition;
  transmitting the public message to the first client, the public message carrying first information and a second information set, wherein the second information set comprises N pieces of second information, with N being a positive integer, the first information is only allowed to be realized by the first client and the second information is only allowed to be realized by a client in a sharing relationship with the first client;
  receiving an information sharing request transmitted by the first client, the information sharing request carrying the second information and information about one or more target users, and the information sharing request being configured to indicate that the second information is to be shared to the one or more target users;
  extracting the second information and the information about the one or more target users in the information sharing request, generating a sharing notification message according to the extracted second information and the extracted information about the one or more target users, and transmitting the sharing notification message to one or more clients of the one or more target users, the sharing notification message being configured to notify the one or more target users that a user of the first client requests to share the second information;
  receiving a request for getting the second information from a second client, verifying whether the second client is in the sharing relationship with the first client, and after the second client is determined to be in the sharing relationship with the first client, allowing the second client to realize the second information
  wherein a corresponding relationship between the first information and the second information set is maintained in a Data Base (DB) of a server, and the second information which has been realized is counted;
  after the second client is determined to be in the sharing relationship with the first client, the operations further comprise determining whether the amount of the second information which has been realized reaches N, notifying the second client that all of the second information has been realized if the amount reaches N, and if the amount doesn't reach N, allowing the second client to realize the second information; and
  wherein the first information and the second information are cash-filled red packets issued by the official account, and the operation of allowing the second client to realize the second information comprises:
    notifying a transfer charging terminal to execute transfer processing on an account of a user of the second client, and correspondingly modifying an amount in the account, stored in the DB of the server, of the user of the second client, and
    transmitting a message notifying that the second information is successfully realized to the second client after the transfer processing is finished.

6. The non-transitory computer-readable storage medium according to claim 5, wherein the operation of verifying whether the second client is in the sharing relationship with the first client comprises:
  acquiring user information of the first client and information about users sharing information with a user of the first client, and acquiring user information of the second client; and
  searching whether the information about the users sharing information with the user of the first client comprises the user information of the second client, determining that the second client is in the sharing relationship with the first client if YES, and if NO, determining that the second client is not in the sharing relationship with the first client.

* * * * *